UNITED STATES PATENT OFFICE.

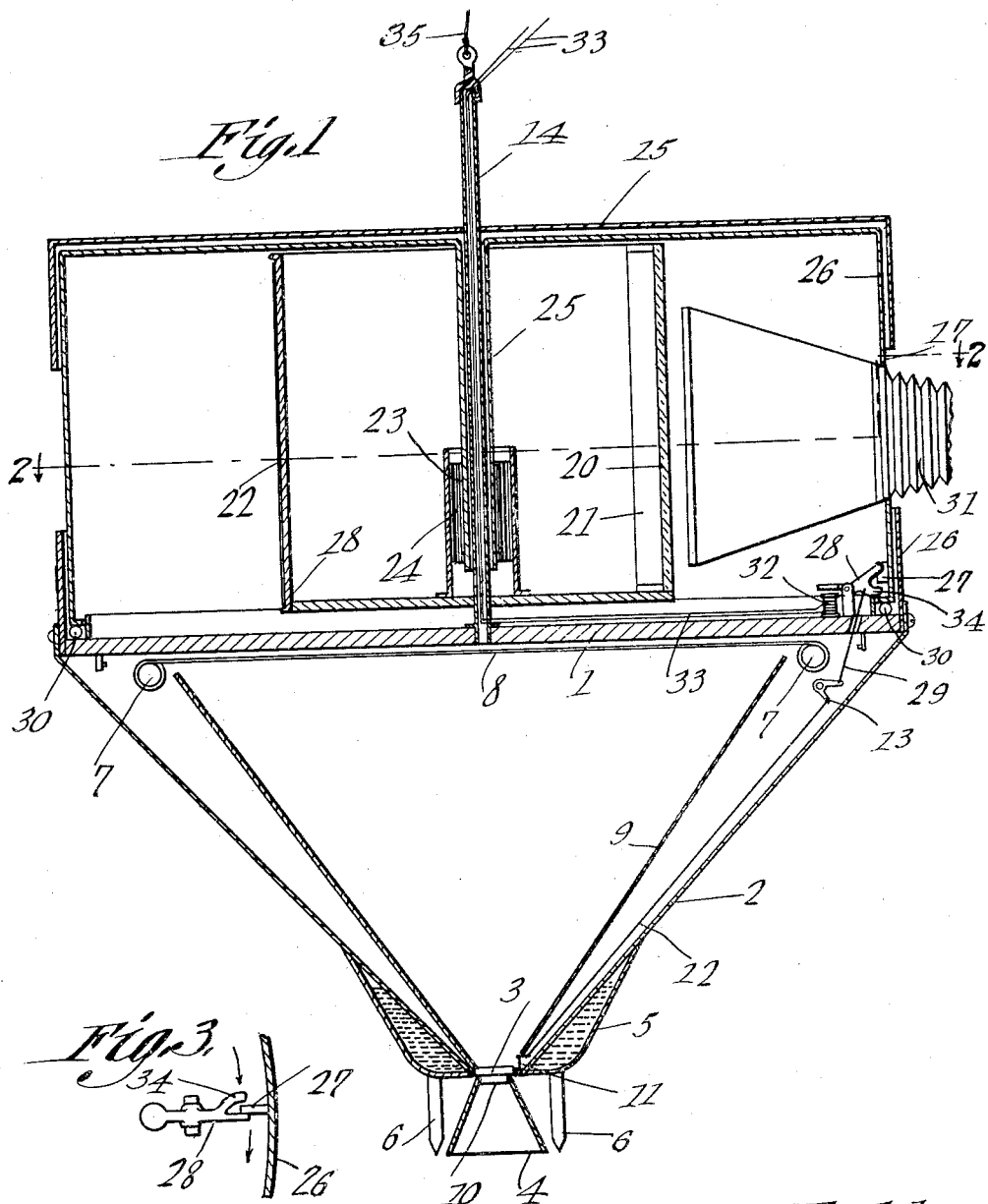

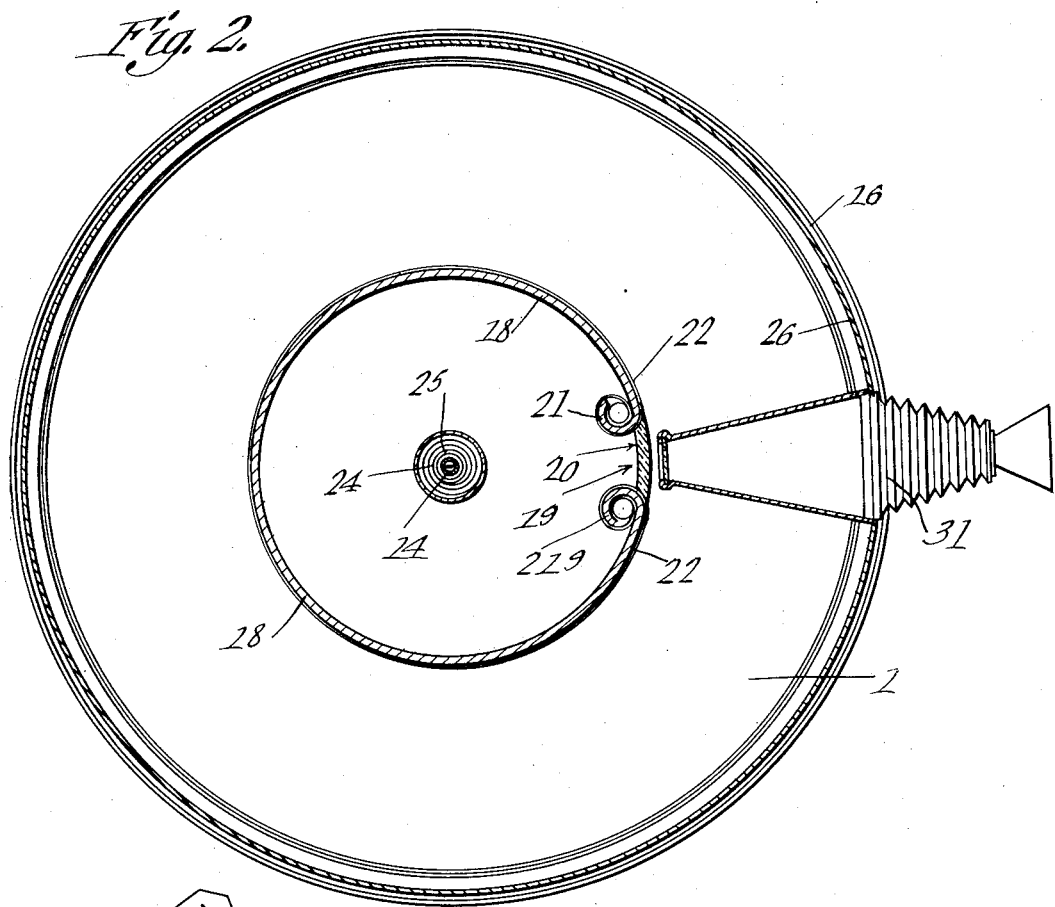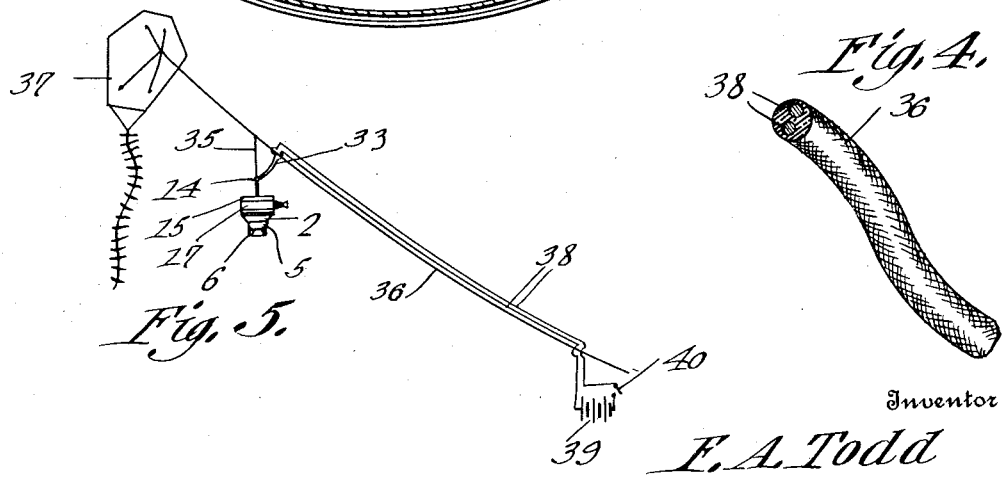

FREDERICK A. TODD, OF BUTTE, MONTANA.

AERIAL CAMERA.

1,313,564.      Specification of Letters Patent.      Patented Aug. 19, 1919.

Application filed November 4, 1918. Serial No. 261,102

*To all whom it may concern:*

Be it known that I, FREDERICK A. TODD, a citizen of the United States, residing at Butte, in the county of Silver Bow and State of Montana, have invented a new and useful Aerial Camera, of which the following is a specification.

This invention relates to aerial cameras, one of its objects being to provide means whereby the camera will combine all the features of an ordinary camera and a panoramic camera thereby to take a picture covering a wide area extending under the downwardly pointed camera and radially in all directions therebeyond.

Another object is to provide a camera of this type which can be held suspended by a kite or other sustaining structure and operated electrically to simultaneously operate all portions of the camera.

A still further object is to provide means whereby the camera will be destroyed if brought down by an enemy.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings—

Figure 1 is a central vertical section through the camera, a portion being broken away.

Fig. 2 is a horizontal section therethrough on line 2—2, Fig. 1.

Fig. 3 is a plan view of the lock of the panoramic portion.

Fig. 4 is a detail view of a portion of the kite cord and showing the use of wires in connection therewith.

Fig. 5 is a view of a kite having the camera suspended from the cord thereof.

Referring to the figures by characters of reference, 1 designates a circular base having a depending conical housing 2 having an opening at the lower end or apex thereof in which is arranged a lens shown generally at 3, there being a conical or flared light shield around the lens opening and extending downwardly therefrom, as shown at 4. A bag 5 for holding mercury is arranged around the lower portion of the casing 2 and acts as a balance for holding the camera upright while suspended and in use. Tubes 6 containing high explosives, are suspended from the lower portion of the structure and are adapted to be exploded and destroy the camera, should it fall to the ground.

Rolls 7 are mounted on the bottom of the base 1 and support a film 8 and a hood extends upwardly from the lens 3 to the film, as shown at 9. The shutter provided for the lens and which has been indicated generally at 10, is connected to a bell crank 11 from which a rod 12 extends to another bell crank 13.

Extending upwardly from the center of the base 1 is a tubular post 14 to which is secured the upper portion of a cylindrical casing, said portion being shown at 15. A flange 16 is connected to and extends upwardly from the base 1 and forms the lower portion of said casing, said flange being spaced from the section 15 to form an annular slot 17. A stationary drum 18 is supported by the post 14 and concentric with the cylindrical casing and has a vertical slot 19 closed by a ground glass 20. The side walls of the slot are inturned as shown at 21 and are adapted to be engaged by the ends of a film strip 22 extending around the drum.

A motor 23 is housed in the drum and may consist of a strong spring 24 one end of which is fastened to the casing of the motor while the other end is attached to a tube 25 mounted for rotation on post 14 and depending from the center of the top of a revoluble cylindrical body 26 inside and close to the wall of the casing 15—16. A projection 27 is extended inwardly from the body 26 and is engaged by one terminal of a forked lever 28 mounted on the base 1 and serving to hold the body 26 against rotation under the action of the spring 24. A rod connects this lever to the bell crank 13, as shown at 29 so that when the lever is shifted out of engagement with the projection 27, the body 26 will be released and the shutter 10 will be operated.

The body 26 is mounted on suitable anti-friction bearings, shown at 30 and mounted in the wall of the body is a flared tube having a bellows 31 carrying a lens, not shown, the tube being located in front of the ground glass 20 when the body 26 is locked against movement.

One end of the lever 28 constitutes the armature of a magnet 32 and wires 33 are extended from this magnet through the post 14. The lower terminal of the forked end of the lever is offset, as at 34 and forms an escapement finger to prevent more than one rotation of the body 26 during each actuation of the lever.

In using the camera the films or other sensitized materials are placed in proper positions at 8 and 22. The post 14 is then connected by a cord 35 to the cord 36 of the kite 37, there being wires 38 within the cord 36 as shown, or extended therealong in any other desired manner. The wires 33 are connected to the wires 38 and are connected at their lower ends, to a battery 39, there being a switch 40 for opening and closing the circuit. When the camera has ascended a desired distance the circuit is closed through the switch 40 and this causes the magnet 32 to be energized and to attract its armature 28. Shutter 10 is promptly operated and, at the same time, the projection 27 is released so that the body 26 will rotate rapidly about the drum 18, causing an exposure throughout the length of the film 22. The exposure of the film 8 together with that of the film 22 will result in the production of two pictures which can be matched to accurately show the entire area under the camera and for considerable distances surrounding it, such photograph being of considerable military value when used in warfare.

While the camera is shown and described suspended from a kite, it is to be understood that it can be carried by an airship or be suspended from the highest part of a vessel.

What is claimed is:—

1. An aerial camera including a base, means thereunder for photographing the area under the camera, means on the base for holding a sensitized material in cylindrical form, a lens carrier mounted for rotation about said sensitized material, means for holding the carrier against rotation, electrically operated means controlled from a point remote from the camera for simultaneously releasing the lens carrier and the shutter of the first mentioned photographing means, and means for rotating the lens carrier when released.

2. In an aerial camera the combination with a supporting cord, of a base, a post thereon and connected to and suspended from the cord, means under the base for photographing the area beneath the base, a revoluble body upon the base and carrying a lens, means for holding a sensitized material concentric with the body, means for holding the body against movement, electrically operated means controlled from a point remote from the camera for simultaneously operating the shutter of the photographing means under the base and releasing means for rotating the released body relative to the sensitized material concentric therewith, and a weight for holding the camera upright while suspended.

3. In an aerial camera the combination with a base, of a post thereon adapted to be connected to a support, means under the base for photographing the area beneath the base, a body mounted to rotate upon the base and carrying a lens, means for holding a sensitized material concentric with the body, means for holding the body against movement, means controlled from a point remote from the camera for simultaneously operating the shutter of the photographing means under the base and releasing the body, and means for rotating the released body relative to the sensitized material concentric therewith.

4. In an aerial camera the combination with a base, of a post extending from the center of the base, means for connecting the upper end of the post to a support and allowing the post to swing relative to the support, means below the base for taking a bird's eye view, means upon the base for taking a panoramic picture of the area surrounding that in the bird's eye view, mechanism controlled from a point remote from the camera for simultaneously operating the said means, and a weight for holding the camera upright while suspended.

5. An aerial camera including a base, a post thereon, means for connecting the post to a support, photographic means under the base for taking a bird's eye view, photographic means upon the base for taking a panoramic picture of the area surrounding that in the bird's eye view, a stabilizing weight connected to the lower portion of the camera, and electrically operated means controlled from a point remote from the camera for simultaneously operating the photographic means.

In testimony that I claim the foregoing as my own, I have hereto affixed my signature in the presence of two witnesses.

FREDERICK A. TODD.

Witnesses:
G. L. TYLER,
EDDIE MILLER.